(12) United States Patent
Okubo et al.

(10) Patent No.: US 12,252,112 B2
(45) Date of Patent: Mar. 18, 2025

(54) INFORMATION PROCESSING DEVICE, ROUTE INFORMATION PROVIDING METHOD, AND ROUTE INFORMATION PROVIDING SYSTEM

(71) Applicant: TOYOTA JIDOSHA KABUSHIKI KAISHA, Toyota (JP)

(72) Inventors: Atsushi Okubo, Nisshin (JP); Kento Nitta, Tokyo (JP); Takaaki Kato, Saitama (JP); Daiki Kaneichi, Tokyo (JP); Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 17/550,133

(22) Filed: Dec. 14, 2021

(65) Prior Publication Data
US 2022/0258726 A1    Aug. 18, 2022

(30) Foreign Application Priority Data
Feb. 17, 2021    (JP) .................................. 2021-023652

(51) Int. Cl.
| | |
|---|---|
| *B60W 30/06* | (2006.01) |
| *G01C 21/34* | (2006.01) |
| *G08G 1/14* | (2006.01) |

(52) U.S. Cl.
CPC ......... *B60W 30/06* (2013.01); *G01C 21/3476* (2013.01); *G08G 1/142* (2013.01); *B60W 2556/45* (2020.02)

(58) Field of Classification Search
CPC .............. B60W 30/06; B60W 2556/45; G01C 21/3476; G01C 21/3685; G01C 21/3407; G01C 21/00; G01C 21/03; G01C 21/3885; G08G 1/142; G08G 1/205; G08G 1/096725; G08G 1/096805; G08G 1/144; G08G 1/14; G08G 1/005; G06Q 50/10

See application file for complete search history.

(56) References Cited

U.S. PATENT DOCUMENTS

| | | |
|---|---|---|
| 2016/0148450 A1 | 5/2016 | Ohshima |
| 2018/0087917 A1* | 3/2018 | Adachi .............. G01C 21/3492 |
| 2018/0315312 A1 | 11/2018 | Hayakawa |
| 2019/0075426 A1 | 3/2019 | Nomura et al. |
| 2020/0143683 A1 | 5/2020 | Maruiwa et al. |
| 2020/0207337 A1 | 7/2020 | Kim |

(Continued)

FOREIGN PATENT DOCUMENTS

| | | |
|---|---|---|
| CN | 110211418 A | 9/2019 |
| DE | 102004024756 A1 | 12/2005 |

(Continued)

*Primary Examiner* — Tyler J Lee
(74) *Attorney, Agent, or Firm* — SoraIP, Inc.

(57) ABSTRACT

An information processing device includes: an acquirer configured to acquire movement information on movement of a vehicle where a user is not on board, the movement information including position information of a movement destination; a storage configured to store the movement information of the vehicle that is acquired by the acquirer; and a controller configured to: generate route information indicating time-series positions of the vehicle based on the movement information stored in the storage; and transmit the route information to an information terminal of the user.

13 Claims, 10 Drawing Sheets

(56) References Cited

U.S. PATENT DOCUMENTS

| | | | |
|---|---|---|---|
| 2020/0269835 A1 | 8/2020 | Hara et al. | |
| 2020/0283022 A1* | 9/2020 | Hara | B60W 60/0025 |
| 2020/0302791 A1* | 9/2020 | Yamane | G08G 1/146 |

FOREIGN PATENT DOCUMENTS

| | | |
|---|---|---|
| JP | 2011027425 A | 2/2011 |
| JP | 2011054116 A | 3/2011 |
| JP | 2016-097927 A | 5/2016 |
| JP | 2020-077064 A | 5/2020 |
| JP | 2020-138612 A | 9/2020 |
| KR | 10-2018-0067643 A | 6/2018 |
| KR | 10-2019-0026600 A | 3/2019 |
| KR | 10-2020-0034031 A | 3/2020 |
| KR | 10-2020-0092443 A | 8/2020 |

* cited by examiner

FIG. 7

| VEHICLE ID | MOVEMENT START TIME | MOVEMENT END TIME | DEPARTING PLACE | MOVEMENT DESTINATION | INSTRUCTOR | EVALUATION VALUE |
|---|---|---|---|---|---|---|
| 000001 | hh:mm:ss | hh:mm:ss | UNLOADING SPACE IN PARKING LOT | PARKING POSITION NUMBER IN PARKING LOT: N1 | PARKING LOT SERVER | 5 |
| 000001 | hh:mm:ss | hh:mm:ss | PARKING POSITION NUMBER IN PARKING LOT: N1 | PARKING POSITION NUMBER IN PARKING LOT: N2 | USER'S VEHICLE | |
| 000001 | hh:mm:ss | hh:mm:ss | PARKING POSITION NUMBER IN PARKING LOT: N2 | PARKING POSITION NUMBER IN PARKING LOT: N3 | PARKING LOT SERVER | 4 |
| 000002 | hh:mm:ss | hh:mm:ss | PARKING POSITION NUMBER IN PARKING LOT: N4 | OUTSIDE PARKING LOT NORTH LATITUDE: *** EAST LONGITUDE: *** | PARKING LOT SERVER | 2 |
| ... | ... | ... | ... | ... | ... | ... |

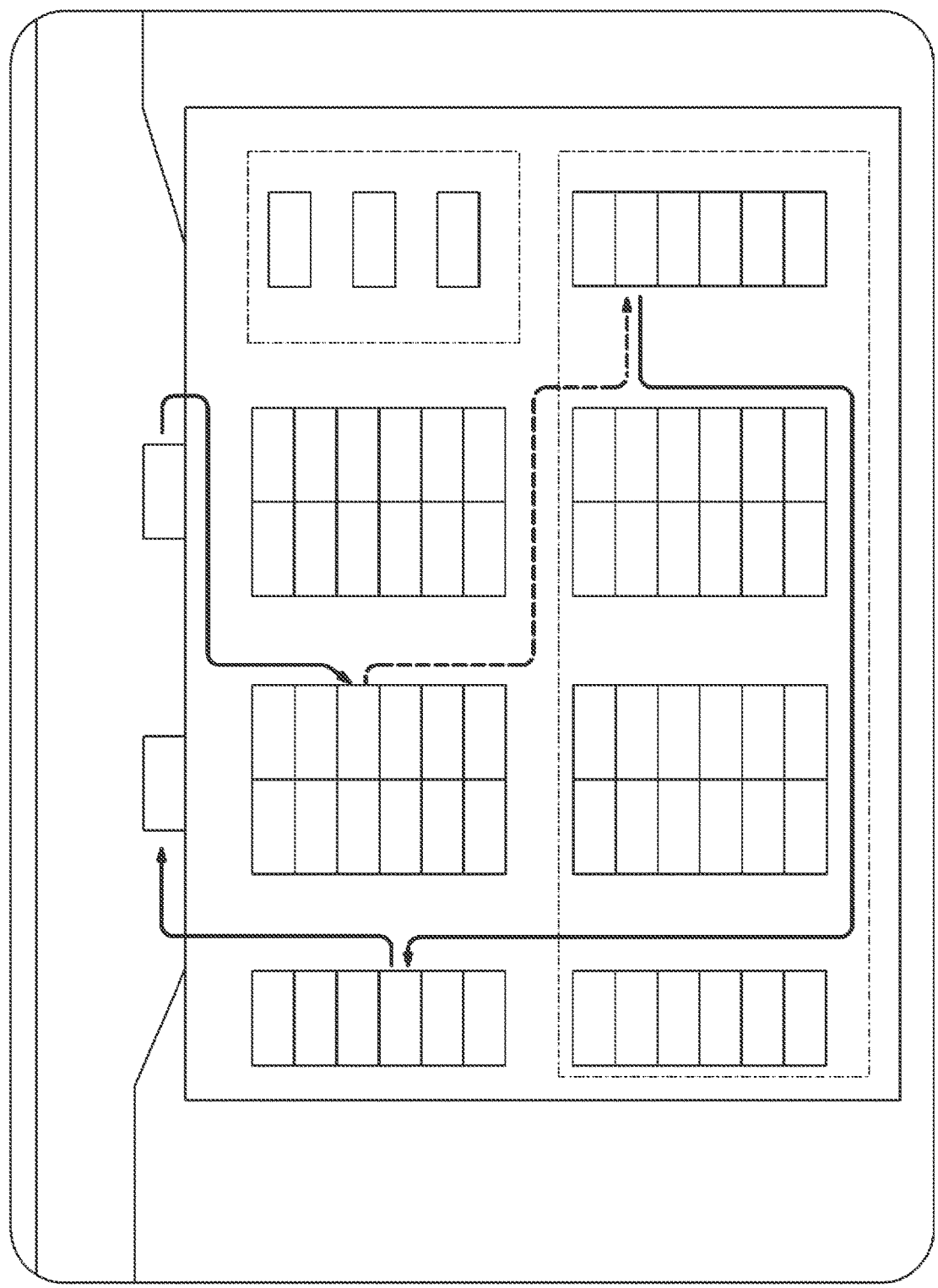

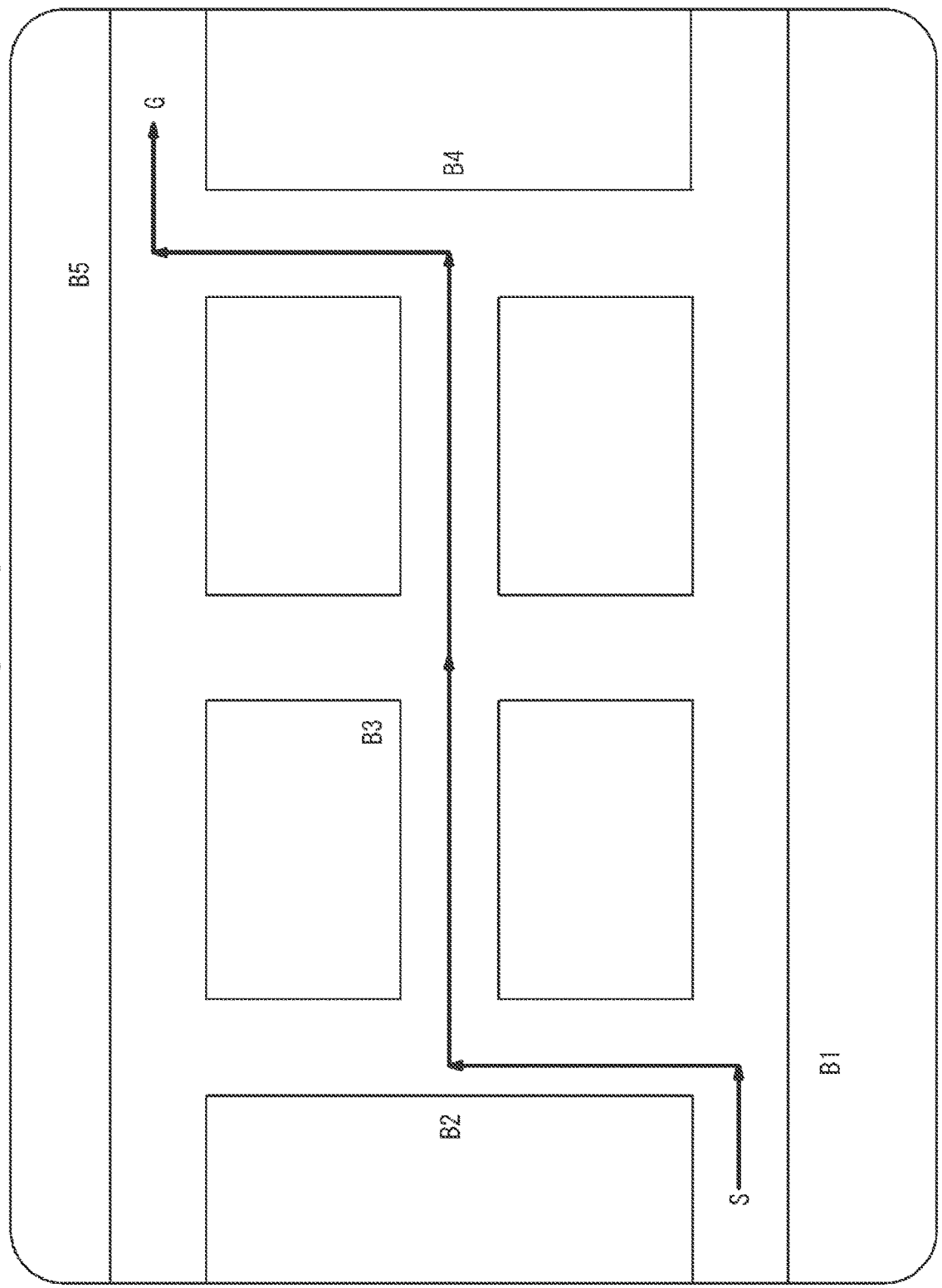

INFORMATION PROCESSING DEVICE, ROUTE INFORMATION PROVIDING METHOD, AND ROUTE INFORMATION PROVIDING SYSTEM

CROSS-REFERENCE TO RELATED APPLICATION

This application claims priority to Japanese Patent Application No. 2021-023652 filed on Feb. 17, 2021, incorporated herein by reference in its entirety.

BACKGROUND

1. Technical Field

The present disclosure relates to an information processing device, a route information providing method, and a route information providing system.

2. Description of Related Art

A car finder system has been proposed to accurately guide a user of a parked vehicle to a parking position of the vehicle in a parking lot having a vast area and attached to a large-scale facility or the like (see, for example, Japanese Unexamined Patent Application Publication No. 2011-027425 (JP 2011-027425 A)). In recent years, development has been promoted for automatic valet parking in which a management device that manages a parking lot guides a vehicle to an available parking space in the parking lot by utilizing an autonomous driving technology for the vehicle (see, for example, Japanese Unexamined Patent Application Publication No. 2011-54116 (JP 2011-54116 A)). In the automatic valet parking, when a user gets out of the vehicle at an unloading position, the unmanned vehicle moves to the parking space by an autonomous driving function. When the user calls the vehicle via a smartphone or the like to get into the vehicle, the vehicle parked in the parking lot travels to a user's loading position by the autonomous driving function.

SUMMARY

When a vehicle with an autonomous driving function is parked in the automatic valet parking or the like and a user is not on board, the vehicle may move voluntarily or in response to an instruction from an external system such as a parking lot server that manages the parking lot. The vehicle moving along a road by autonomous driving may change its movement route in response to information or an instruction from the outside. The user who manages the vehicle may want to know the movement route in order to confirm that the movement of the unmanned vehicle is valid.

The present disclosure provides an information processing device, a route information providing method, and a route information providing system capable of presenting information on a movement route of an unmanned vehicle to a user.

An information processing device according to an aspect of the present disclosure includes: an acquirer configured to acquire movement information on movement of a vehicle where a user is not on board, the movement information including position information of a movement destination; a storage configured to store the movement information of the vehicle that is acquired by the acquirer; and a controller configured to: generate route information indicating time-series positions of the vehicle based on the movement information stored in the storage; and transmit the route information to an information terminal of the user.

A route information providing method according to a second aspect of the present disclosure is executed by an information processing device. The route information providing method includes: acquiring movement information on movement of a vehicle where a user is not on board, the movement information including position information of a movement destination; storing the movement information of the vehicle; generating route information indicating time-series positions of the vehicle based on the stored movement information; and transmitting the route information to an information terminal of the user.

A route information providing system according to a third aspect of the present disclosure includes: a vehicle; and an information processing device. The vehicle includes a vehicle control device. The vehicle control device is configured to transmit, to the information processing device, movement information on movement of the vehicle where a user is not on board, the movement information including position information of a movement destination. The information processing device includes: an acquirer configured to acquire the movement information from the vehicle; a storage configured to store the movement information of the vehicle that is acquired by the acquirer; and a controller configured to: generate route information indicating time-series positions of the vehicle based on the movement information stored in the storage; and transmit the route information to an information terminal of the user.

According to the present disclosure, it is possible to provide the information processing device, the route information providing method, and the route information providing system capable of presenting the movement route of the unmanned vehicle to the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of movement information to be stored in the information processing device;

FIG. 8 is a diagram illustrating an example of route information to be displayed on an information terminal;

FIG. 10 is a diagram illustrating an example of route information to be displayed on the information terminal in the case of FIG. 9.

DETAILED DESCRIPTION OF EMBODIMENTS

Figure 1:
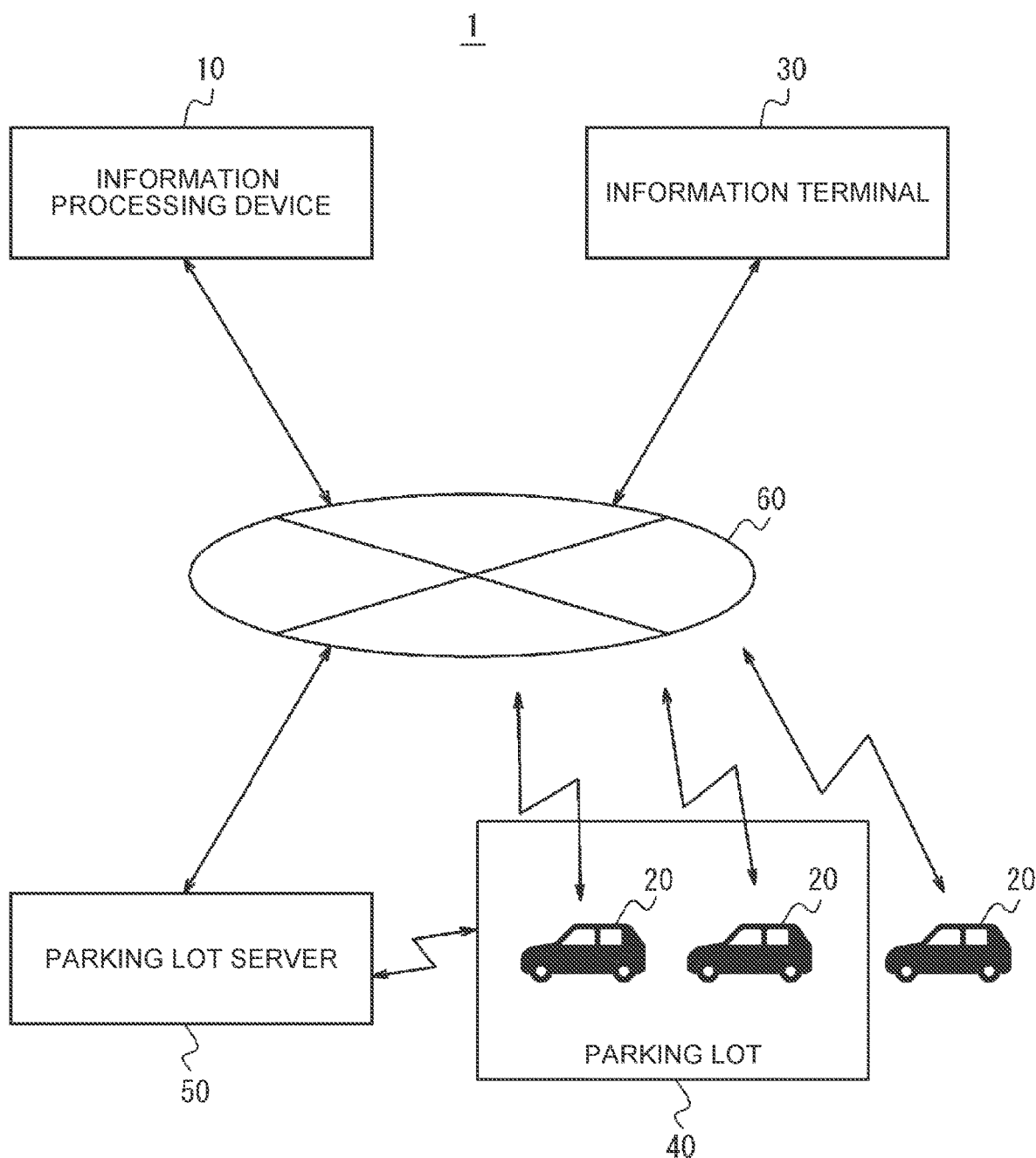
FIG. 1 is a block diagram illustrating a schematic configuration of a route information providing system according to one embodiment.

An embodiment of the present disclosure will be described below with reference to the drawings. As illustrated in FIG. 1, a route information providing system 1 according to the embodiment of the present disclosure includes an information processing device 10 and one or more vehicles 20. The route information providing system 1 can provide route information related to movement of each vehicle 20 to an information terminal 30 of a user of the vehicle 20. The route information of the vehicle 20 indicates a change in the position of the vehicle 20 in time series.

The route information providing system 1 provides route information when the vehicle 20 moves while the user of the vehicle 20 is not in the vehicle 20. Examples of the user of the vehicle 20 include a person who usually drives the vehicle 20, and a person who owns and manages the vehicle 20. The vehicle 20 includes an autonomous driving vehicle capable of traveling autonomously even when the user who drives the vehicle 20 is not on board. That is, the movement of the vehicle 20 in the present disclosure includes movement by autonomous driving. The vehicle 20 may be moved by being towed by a robot or loaded on a movable pedestal.

In one embodiment, some of the vehicles 20 are parked in a parking lot 40 by the users. The information processing device 10 may acquire information on movement in the parking lot 40 from each vehicle 20. When the vehicle 20 is parked in the parking lot 40, the route information providing system 1 may include a parking lot server 50. The parking lot server 50 manages facilities used as parking lots. The parking lot server 50 can manage the position and movement of each vehicle 20 in the parking lot 40. The parking lot server 50 may transmit movement information of the vehicle 20 in the parking lot 40 to the information processing device 10. The information terminal 30 can receive route information of the vehicle 20 in the parking lot 40 from the information processing device 10.

The information processing device 10 may be communicable with the vehicle 20, the information terminal 30, and the parking lot server 50 via a network 60. The information processing device 10, the information terminal 30, and the parking lot server 50 may be connected to the network 60 by wired or wireless lines. The vehicle 20 may be connected to the network 60 by a wireless communication line. The vehicle 20 and the parking lot server 50 may be communicable directly with each other via the network 60 or by other communication means without the network 60.

Configuration of Information Processing Device

Figure 2:
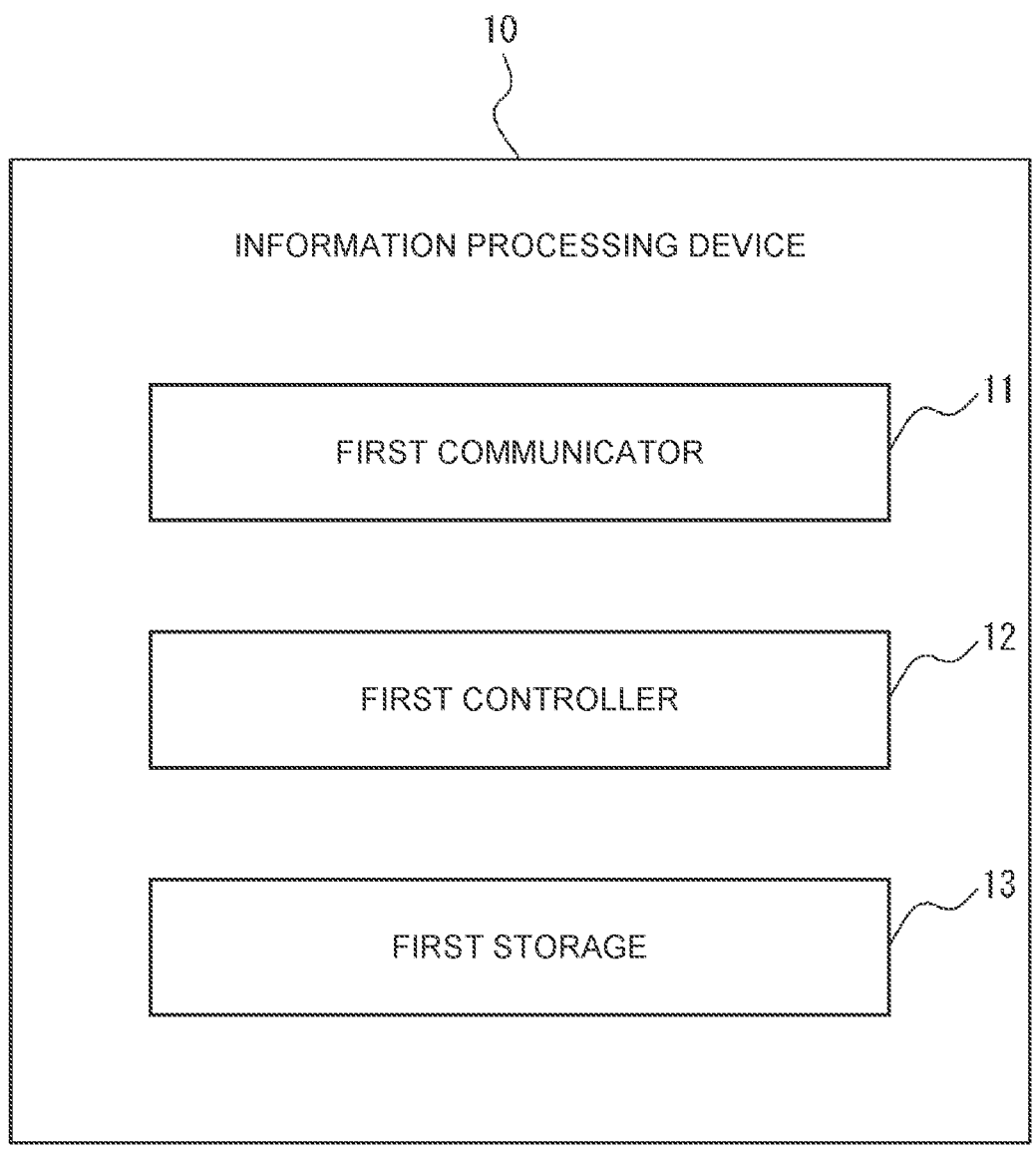
FIG. 2 is a block diagram illustrating a schematic configuration of an information processing device in FIG. 1.

As illustrated in FIG. 2, the information processing device 10 according to the embodiment of the present disclosure includes a first communicator 11, a first controller 12, and a first storage 13. The information processing device 10 may be a general-purpose computer such as a personal computer (PC). The information processing device 10 is not limited to one piece of hardware, and may be composed of a plurality of pieces of hardware connected by a local area network (LAN) or the like. A plurality of pieces of hardware having the functions of the information processing device 10 may be distributed geographically via the network 60.

The first communicator 11 includes a communication interface connected to the network 60. The communication interface may support one or more communication standards out of various communication standards such as a wired LAN, a wireless LAN, an optical communication line, and a digital subscriber line. The information processing device 10 is connected to the network 60 via the first communicator 11. The first communicator 11 is an acquirer.

The first controller 12 includes one or more processors. In the present disclosure, the processor includes a general-purpose processor that executes a programmed function by loading a program, and a dedicated processor that is dedicated to specific processes. Examples of the dedicated processor include a digital signal processor (DSP), an application specific integrated circuit (ASIC), and a field-programmable gate array (FPGA). The first controller 12 may further include a memory.

The first controller 12 controls overall operations of the information processing device 10. The first controller 12 can exchange information with the vehicle 20, the information terminal 30, and the parking lot server 50 via the first communicator 11. The first controller 12 can store information acquired via the first communicator 11 in the first storage 13. The first controller 12 can execute various processes on the information stored in the first storage 13.

The first storage 13 stores any information to be used for the operations of the information processing device 10. The first storage 13 may include at least one of a semiconductor storage device, a magnetic storage device, and an optical storage device. The semiconductor storage device may include at least one memory out of a read only memory (ROM), a random access memory (RAM), a flash memory, and the like.

Configuration of Vehicle

Figure 3:
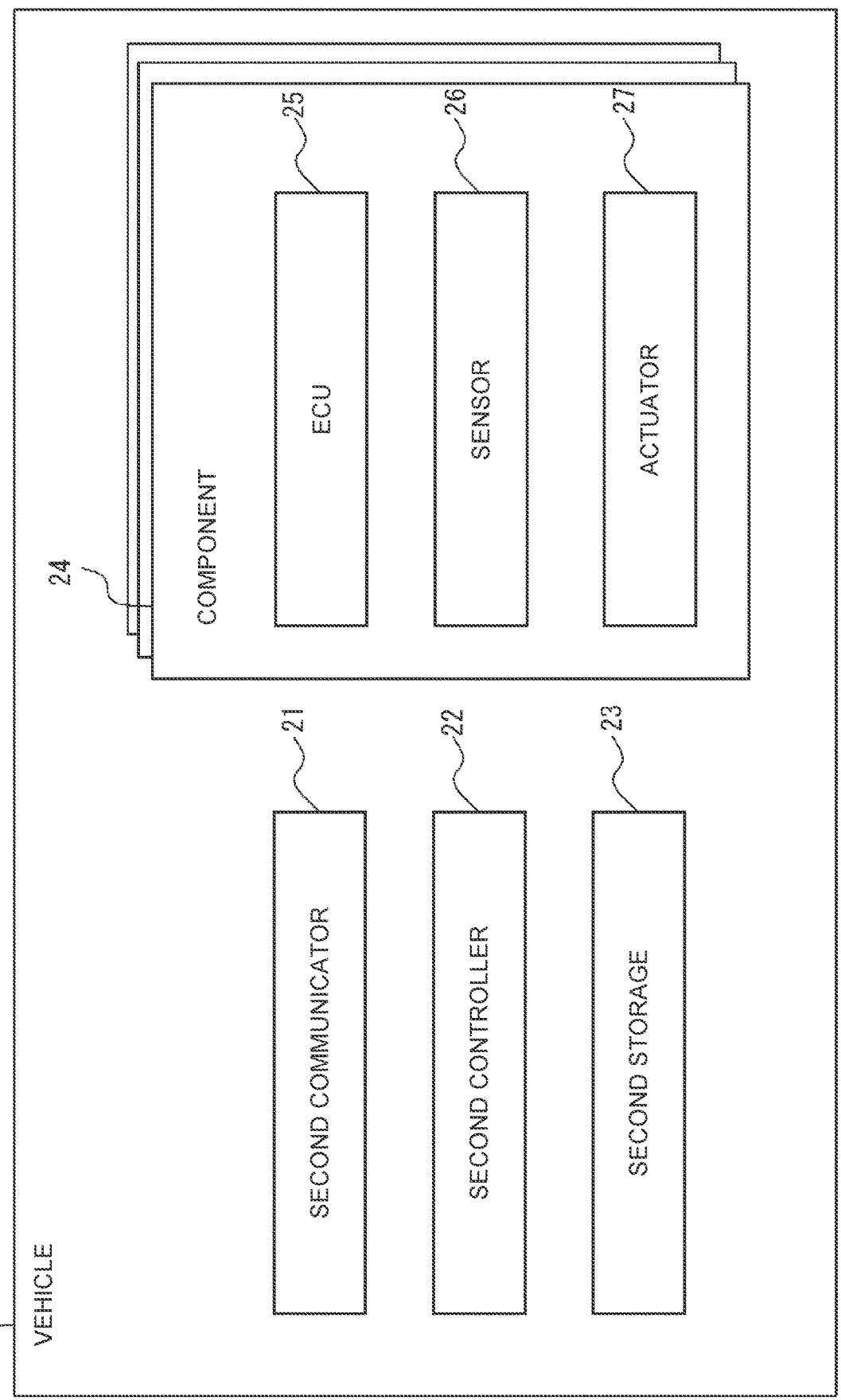
FIG. 3 is a block diagram illustrating a schematic configuration of a vehicle in FIG. 1.

As illustrated in FIG. 3, the vehicle 20 includes a second communicator 21, a second controller 22, a second storage 23, and each component 24. The second controller 22 is a vehicle control device that controls the entire vehicle 20. Each component 24 of the vehicle 20 corresponds to various parts or components of the vehicle 20. The component 24 includes various components of the vehicle 20 such as an engine, a motor, a brake, a steering system, a navigation system, and a battery. Each component 24 includes an electronic control unit (ECU) 25 and at least one of a sensor 26 and an actuator 27. The second controller 22 and each component 24 of the vehicle 20 are communicably connected to each other by a network in the vehicle 20 such as a controller area network (CAN).

The second communicator 21 includes a communication interface connected to the network 60 to communicate with the information processing device 10. The second communicator 21 may include a communication interface that directly communicates with the parking lot server 50 without the network 60. For example, the communication interface supports, but not limited to, 4th generation (4G) and 5th generation (5G) mobile communication standards. The second communicator 21 may include a communication interface that directly communicates with communication equipment 47 (see FIG. 5) in the parking lot 40 by short-range wireless communication.

The second controller 22 controls the entire vehicle 20. The second controller 22 includes one or more processors and a memory, as described for the first controller 12. The second controller 22 can communicate with the ECU 25 of each component 24, acquire information from the sensor 26 of each component 24, and drive the actuator 27 of each component 24. The second controller 22 can realize the autonomous driving of the vehicle 20 in cooperation with each component 24. For example, the autonomous driving includes Levels 1 to 5 defined by the Society of Automotive Engineers (SAE). The autonomous driving is not limited to the above, and may be defined appropriately. In the present embodiment, the vehicle 20 will be described as being capable of autonomous driving without a driver (e.g., Level 5 autonomous driving as defined in the SAE).

The second storage 23 stores any information to be used for operations of the vehicle 20. The second storage 23 may include various storage devices as described for the first storage 13. The second storage 23 may store map information on surrounding roads and parking lots. The second storage 23 can store a schedule created for, for example, energy supply (e.g., battery charging) and maintenance in the parking lot 40.

The ECU 25 is an electronic control device that controls each component 24 in the vehicle 20. The sensor 26 is included in each component 24. Examples of the sensor 26 include a battery voltage sensor. The ECU 25 of the battery can estimate the remaining battery charge level based on a voltage of the battery. The sensor 26 includes a Global Navigation Satellite System (GNSS) receiver for the navigation system. The ECU 25 of the navigation system detects a current position of the vehicle 20 based on a signal received by the GNSS receiver. The GNSS includes the Global Positioning System (GPS). The actuator 27 is controlled by the ECU 25 of each component 24. The actuator 27 includes a motor or the like that drives each component 24.

When the user is not on board, the second controller 22 may voluntarily generate a movement instruction for movement in accordance with a schedule preset in the second storage 23. The second controller 22 may move the vehicle 20 in response to an external movement instruction from, for example, the parking lot server 50 via the second communicator 21. When the vehicle 20 moves while the user is not on board, the second controller 22 transmits movement information related to the movement of the vehicle 20 to the information processing device 10 via the second communicator 21. The movement information includes information for identifying the vehicle 20 and position information of a movement destination of the vehicle 20. The movement information may include position information of a departing place, position information on the way to the movement destination, and time information on, for example, the start and end of the movement. The second controller 22 may transmit the movement information to the information processing device 10 at least at any one of timings when the movement to the movement destination is started and when the movement to the movement destination is completed.

When limited to movement within the parking lot, the vehicle 20 need not have an advanced autonomous driving function in some cases. For example, when the vehicle 20 is moved by traction or on a movable pedestal as described above, the vehicle 20 can generate movement information and transmit the movement information to the information processing device 10 as long as the vehicle 20 can detect its passed position.

Configuration of Information Terminal

The information terminal 30 includes an input/output unit, an information processor, a communicator, and a memory. The information terminal 30 may be a smartphone, a mobile personal computer, a portable information terminal, or other general-purpose devices. For example, the input/output unit includes a touch-operable display panel (touch panel). The information terminal 30 can receive input from the user by the input/output unit, and display information processed by the information processor for the user. The information processor includes a processor. The information processor executes various information processes in the information terminal 30. For example, the communicator includes a wireless communication interface that supports a communication scheme of the network 60. The information terminal 30 can communicate with the information processing device 10 via the network 60 by using the communicator. The information terminal 30 may communicate with the vehicle 20 and the parking lot server 50 via the network 60. For example, the user may instruct the parking lot server to cause the vehicle 20 to enter or exit the parking lot by using the information terminal 30. The communication between the information terminal 30 and each of the vehicle 20 and the parking lot server 50 may be performed via the information processing device 10.

The information terminal 30 can operate an application to use a service provided by the route information providing system 1. Based on the application, the information terminal 30 can receive information input from the user, output information to the user, and exchange information with the information processing device 10. For example, the user can obtain the application from a business operator that operates the information processing device 10.

Configurations of Parking Lot and Parking Lot Server

Figure 4:
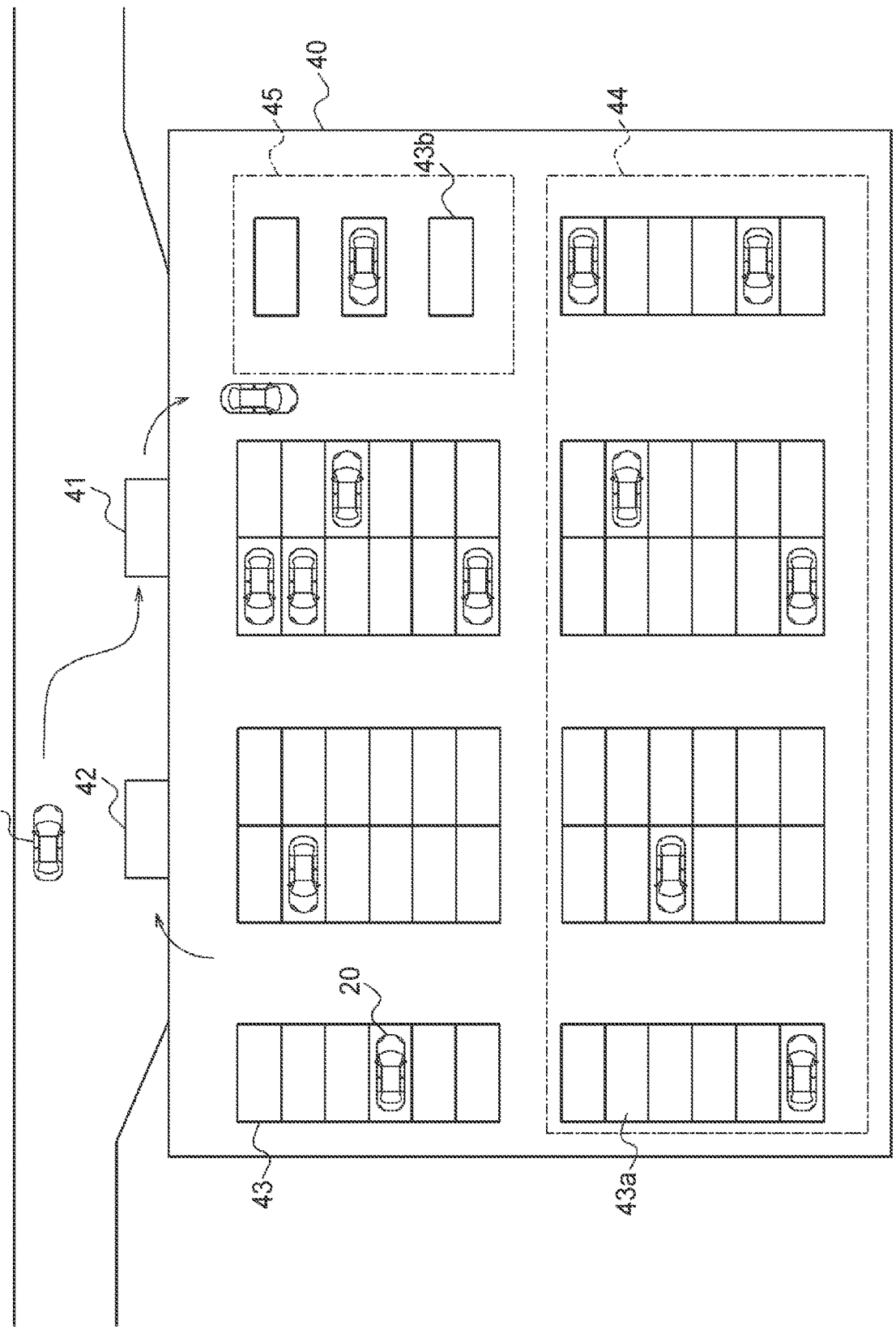
FIG. 4 is a plan illustrating an example of arrangement of parking spaces in a parking lot.

FIG. 4 is an example of a plan of the parking lot 40. The parking lot 40 may be an automatic valet parking lot. In automatic valet parking, when the user gets out of the vehicle 20 in an unloading space 41 of the parking lot 40, the vehicle 20 communicates with the parking lot server 50, travels in the parking lot 40 without occupants, and is parked in a parking space 43 designated by the parking lot server 50. To get into the vehicle 20 again, the user can call the vehicle 20 into a loading space 42 of the parking lot 40 by using the information terminal 30 or the like. Although FIG. 4 illustrates a small number of parking spaces 43 in the parking lot 40 for the sake of description, the parking lot 40 may include a large number of parking spaces 43 on the order of hundreds to thousands of vehicles.

In the parking lot 40, a plurality of parking lot sensors 46 (see FIG. 5) is arranged to safely guide the vehicle 20 to the parking space 43. The parking lot sensor 46 includes, for example, a sensor for detecting availability of each parking space 43, and a sensor for detecting, for example, the size and arrangement of each vehicle 20 in the parking lot 40. The parking lot sensor 46 may include a loop coil sensor, an ultrasonic sensor, an optical sensor, and an image sensor using a camera.

The parking lot 40 may offer not only a service for parking the vehicle 20 but also various other services. For example, the parking lot 40 may include energy supply equipment in the parking space 43 to offer an energy supply service to the vehicle 20. Examples of the energy include gasoline, electric power, and hydrogen. In FIG. 4, it is assumed that the parking lot 40 supplies electric power to the vehicle 20. In the example of FIG. 4, the vehicle 20 is chargeable in a parking space 43a in a chargeable area 44 indicated by a long dashed short dashed line. The parking lot 40 may include a vehicle washing area 45 provided with vehicle washing equipment in a parking space 43b.

In the parking lot 40, the vehicle 20 may change the current parking space 43 with a trigger of a process caused by its second controller 22. Such a case is herein referred to as "voluntary" movement of the vehicle 20. For example, the vehicle 20 may move voluntarily to receive energy supply. For example, when the second controller 22 of the vehicle 20 determines that the remaining battery charge level acquired from the ECU 25 of the battery is smaller than a predetermined value, the second controller 22 may transmit a request to the parking lot server 50 to move toward the parking space 43a in the chargeable area 44. When any parking space 43 in the chargeable area 44 is available, the parking lot server 50 can guide the vehicle 20 to the parking space 43a in the chargeable area 44.

The user of the vehicle 20 may make a reservation for vehicle washing in the vehicle washing area 45 in the parking lot 40. In that case, the vehicle 20 may store reservation information in the second storage 23. At a reserved time, the second controller 22 of the vehicle 20 requests the parking lot server 50 to move the vehicle 20 to the parking space 43b in the vehicle washing area 45. When the parking lot server 50 confirms that the reservation information is correct, the parking lot server 50 guides the vehicle 20 to the parking space 43b in the vehicle washing area 45. In the vehicle washing area 45, the vehicle 20 receives a vehicle washing service.

In the parking lot 40, the vehicle 20 may move the parking position in response to an instruction from the parking lot server 50. For example, when the parking lot server 50 receives a charging request from another vehicle 20, the parking lot server 50 may issue a movement instruction to the vehicle 20 located in the parking space 43a in the chargeable area 44. For example, the parking lot server 50 may manage a plurality of parking lots 40 and move the vehicle 20 between the parking lots. The parking lot server 50 may move the vehicle 20 to another parking lot when the parking lot 40 is congested and the user does not plan to get into the vehicle 20 immediately.

The vehicle 20 may receive an external movement instruction inside the parking lot 40 or outside the parking lot 40. For example, the vehicle 20 may be set to accept a movement instruction from a road manager, a local government, or the like so as not to interfere with road traffic in the event of a disaster or the like.

Figure 5:
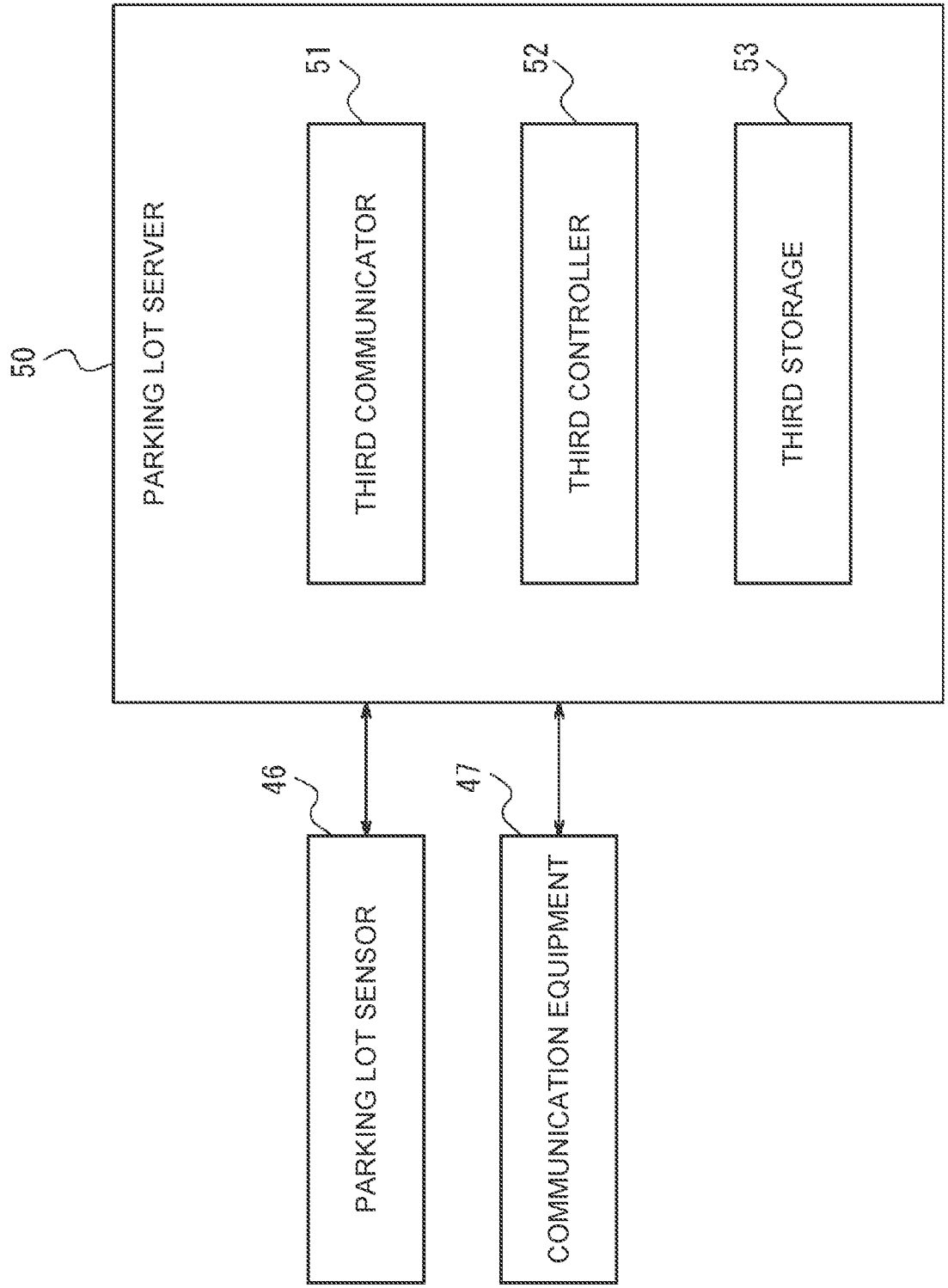
FIG. 5 is a block diagram illustrating a schematic configuration of a parking lot server in FIG. 1 together with equipment in the parking lot.

As illustrated in FIG. 5, the parking lot server 50 includes a third communicator 51, a third controller 52, and a third storage 53. The parking lot server 50 is communicable with the parking lot sensor 46 and the communication equipment 47 in the parking lot 40.

Similarly to the first communicator 11, the third communicator 51 may include a communication interface connected to the network 60 to communicate with the information processing device 10, the vehicle 20, and the information terminal 30 of the user. The third communicator 51 may communicate with the vehicle 20 via the communication equipment 47 in the parking lot 40 without the network 60.

The third controller 52 controls the entire parking lot server 50. The third controller 52 includes one or more processors and a memory, as described for the first controller 12.

The third controller 52 can acquire availability of each parking space 43 from the parking lot sensor 46. The third controller 52 can instruct the vehicle 20 arriving at the unloading space 41 about a route to the available parking space 43 in the parking lot 40. When the parking space 43 has a height limit or the like, the third controller 52 allocates the parking space 43 to the vehicle 20 in consideration of the limit. The third controller 52 can instruct the vehicle 20 that has received an exit instruction about a route from the parking space 43 where the vehicle 20 is parked to the loading space 42. The third controller 52 can move the vehicle 20 in the parking lot 40 to another parking space 43 for various reasons described above.

Although not essential, the third controller 52 may transmit movement information to the information processing device 10 via the third communicator 51 when the vehicle 20 is moved.

The third storage 53 stores any information to be used for processes in the parking lot server 50. The third storage 53 may include various storage devices as described for the first storage 13. The third storage 53 stores map information indicating a shape of the parking lot 40 and arrangement of the parking spaces 43 and traveling roads in the parking lot 40. The third storage 53 stores a height limit and other limits on the vehicle 20 that can be parked for each parking space 43. When the user has made a reservation for the use of the parking lot 40 and the use of the charging or vehicle washing service in the parking lot 40, the third storage 53 can store information on the reservation. When the user inputs an expected exit time by using the information terminal 30, the third storage 53 may store the exit time.

Processing Flow of Information Processing Device

Figure 6:
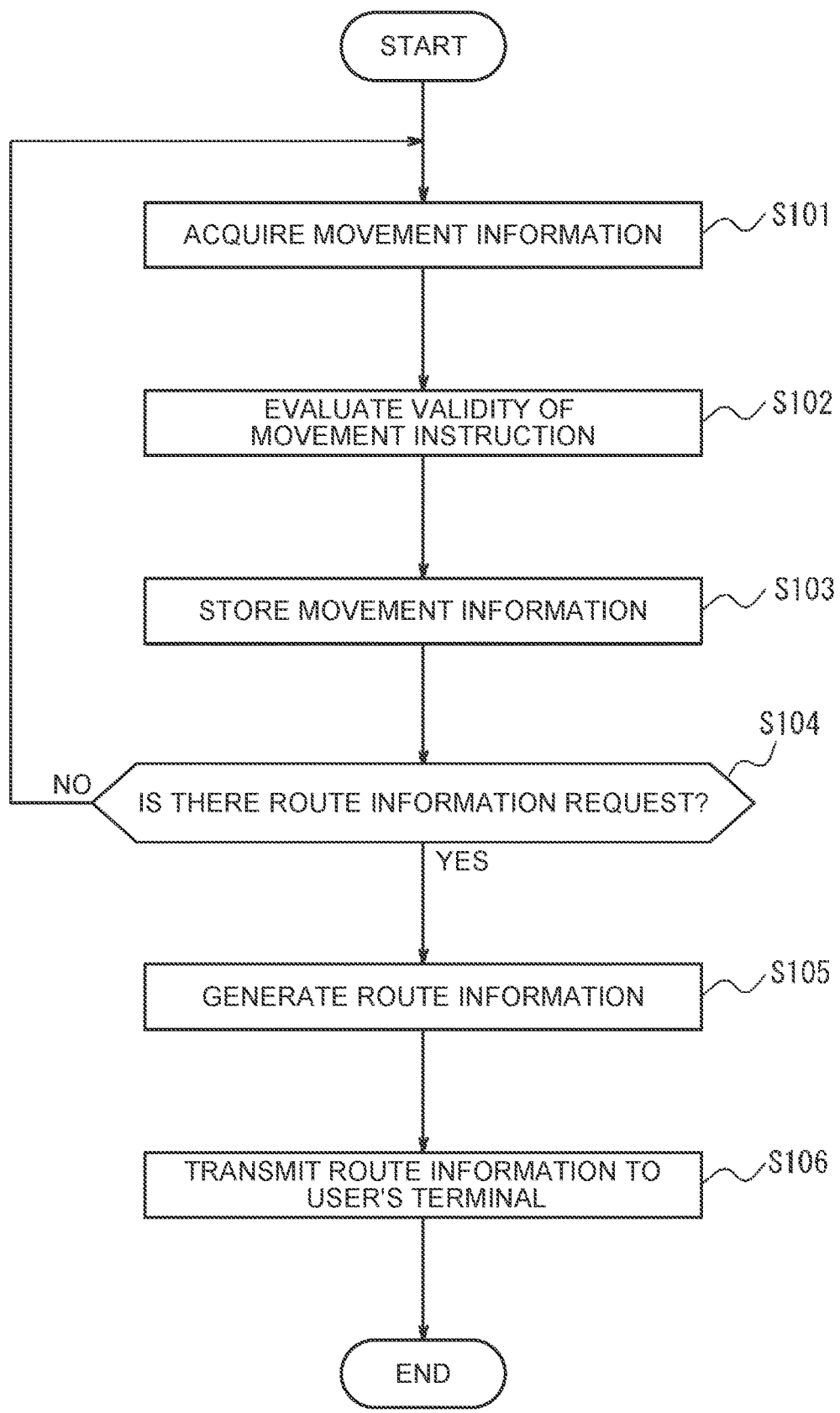
FIG. 6 is a flow chart illustrating an example of a process to be executed by the information processing device.

Next, a process to be executed by the information processing device 10 will be described with reference to a flowchart of FIG. 6. The flowchart of FIG. 6 illustrates an example of a procedure for executing a route information providing method. The process illustrated in the flowchart of FIG. 6 can be executed by the information processing device 10 based on a program. Such a program can be stored in a non-transitory computer-readable medium. Examples of the non-transitory computer-readable medium include hard disks, RAMs, ROMs, flash memories, compact disc (CD)-ROMs, optical storage devices, and magnetic storage devices, but are not limited to these media.

The first communicator 11 of the information processing device 10 can acquire movement information from the vehicle 20 when the vehicle 20 moves while the user is not on board (Step S101). The vehicle 20 may transmit the movement information to the information processing device 10 at least at any one of timings when the movement is started and when the movement is completed. When the vehicle 20 is parked by automatic valet parking, the first communicator 11 may acquire movement information from the parking lot server 50 as well as the vehicle 20.

The movement information includes at least information for identifying the vehicle 20 and position information indicating a position of a movement destination. The information for identifying the vehicle 20 may be a number assigned to the vehicle 20. The position information may include latitude and longitude information. In a case of a specific parking lot 40, the position information may include information for specifying the parking space 43 in the parking lot 40. In that case, the information processing device 10 may acquire the map information in the parking lot 40 from the parking lot server 50. The movement information may further include information on a time when the vehicle 20 starts movement and a time when the vehicle 20 completes the movement.

The movement information may further include information indicating whether the movement is voluntarily performed by the vehicle 20 or caused in response to an instruction from an external device located outside the vehicle 20. Therefore, the movement information may include information on an instructor who has given the instruction for the movement. When the vehicle 20 moves voluntarily, the instructor may be the vehicle 20 itself. When the vehicle 20 moves in response to an instruction from the parking lot server 50, the instructor may be the parking lot server 50.

When the first controller 12 of the information processing device 10 acquires the movement information via the first communicator 11, the first controller 12 may evaluate the validity of the movement instruction about the movement of the vehicle 20 activated by the instruction from the outside of the vehicle 20 (Step S102). The validity of the movement instruction may be evaluated by calculating an evaluation value indicating the validity of the instruction from the external device. The first controller 12 may evaluate the evaluation value based on an index including a movement distance based on the movement instruction. For example, when the parking lot server 50 moves the vehicle 20 by a longer distance, the first controller 12 may determine a lower evaluation value. When the movement information includes the information on the instructor, the first controller 12 may evaluate the evaluation value based on reliability of the instructor. The parking lot server 50 of the parking lot 40 operated by a highly reliable operating entity may have a high degree of reliability. Therefore, the first storage 13 of the information processing device 10 may hold reliability data of each parking lot 40. When the instructor who has given the instruction for the movement is neither the vehicle 20 nor the parking lot server 50, the reliability can be evaluated low.

Step S102 is not an essential step. The first controller 12 of the information processing device 10 need not execute step S102.

After Step S101 and Step S102, the first controller 12 stores the movement information in the first storage 13 (Step S103). When the movement information does not include time information on, for example, the time when the vehicle 20 starts the movement and the time when the vehicle 20 completes the movement, the first controller 12 may add, to the movement information, information on a time when the movement information is acquired. When the first controller 12 has not received a route information request from the user's information terminal 30 (Step S104: No), the first controller 12 repeats Steps S101 to S103 to accumulate the movement information in the first storage 13.

As illustrated in FIG. 7, the movement information stored in the first storage 13 may include, for example, information for identifying the vehicle 20 (vehicle ID), a movement start time, a movement end time, a departing place, a movement destination, an instructor who has given an instruction for movement, and information on an evaluation value.

The user can display route information of the vehicle 20 by using an application on the information terminal 30. When the user performs an operation for displaying the route information on the information terminal 30, the application on the information terminal 30 instructs the information processing device 10 via the network 60 to generate the route information. When the first controller 12 of the information processing device 10 receives the route information request (Step S104: Yes), the first controller 12 generates, based on the movement information stored in the first storage 13, route information indicating the time-series positions of the vehicle 20 in a range between a current time and a time when the user has left the vehicle 20 (Step S105). The information processing device 10 generates the route information by searching the pieces of movement information for the movement information related to the vehicle 20 from which the route information request has been received. The route information may include information indicating movement of the vehicle 20 on a road map or a map in the parking lot 40. The route information may include information on the evaluation value.

When the route information is generated, the first controller 12 transmits the route information to the user's information terminal 30 via the first communicator 11 (Step S106). For example, the information terminal 30 that has received the route information displays the route information as illustrated in FIG. 8 on the display panel of the input/output unit. The route information can be displayed on the map so that a movement route is understandable. The route information may be displayed in the form of a list instead of the information on the map. For example, individual movements are indicated by arrows in FIG. 8. The voluntary movement triggered by the vehicle 20 and the movement caused in response to the instruction from another entity such as the parking lot server 50 may be displayed in different display formats. The different display formats include variations in colors, thicknesses, densities, and line types of arrows indicating movement. When the evaluation value is calculated in Step S102, the evaluation value included in each piece of movement information may be reflected in the arrow display format. For example, the voluntary movement can be indicated by a black arrow. The movement caused in response to the instruction from another entity can be indicated by a blue arrow when the evaluation value is high, and by a red arrow when the evaluation value is low. Due to the difference in the display format, the user can easily recognize that his/her vehicle 20 has moved for the reason involving another entity such as the parking lot server 50. The user can also recognize that his/her vehicle 20 may have moved invalidly or irrationally.

As described above, according to the present embodiment, the first controller 12 generates the route information indicating the time-series positions of the vehicle 20 based on the movement information stored in the first storage 13, and transmits the route information to the user's information terminal 30. As a result, the information terminal 30 can present the movement route of the vehicle 20 to the user while the user is not on board. The user can check, on the map, the movement route of the vehicle 20 while not on board. Thus, it is possible to easily check whether the vehicle 20 has been moved invalidly.

Acquisition of Route Information when Moving Vehicles

Figure 9:
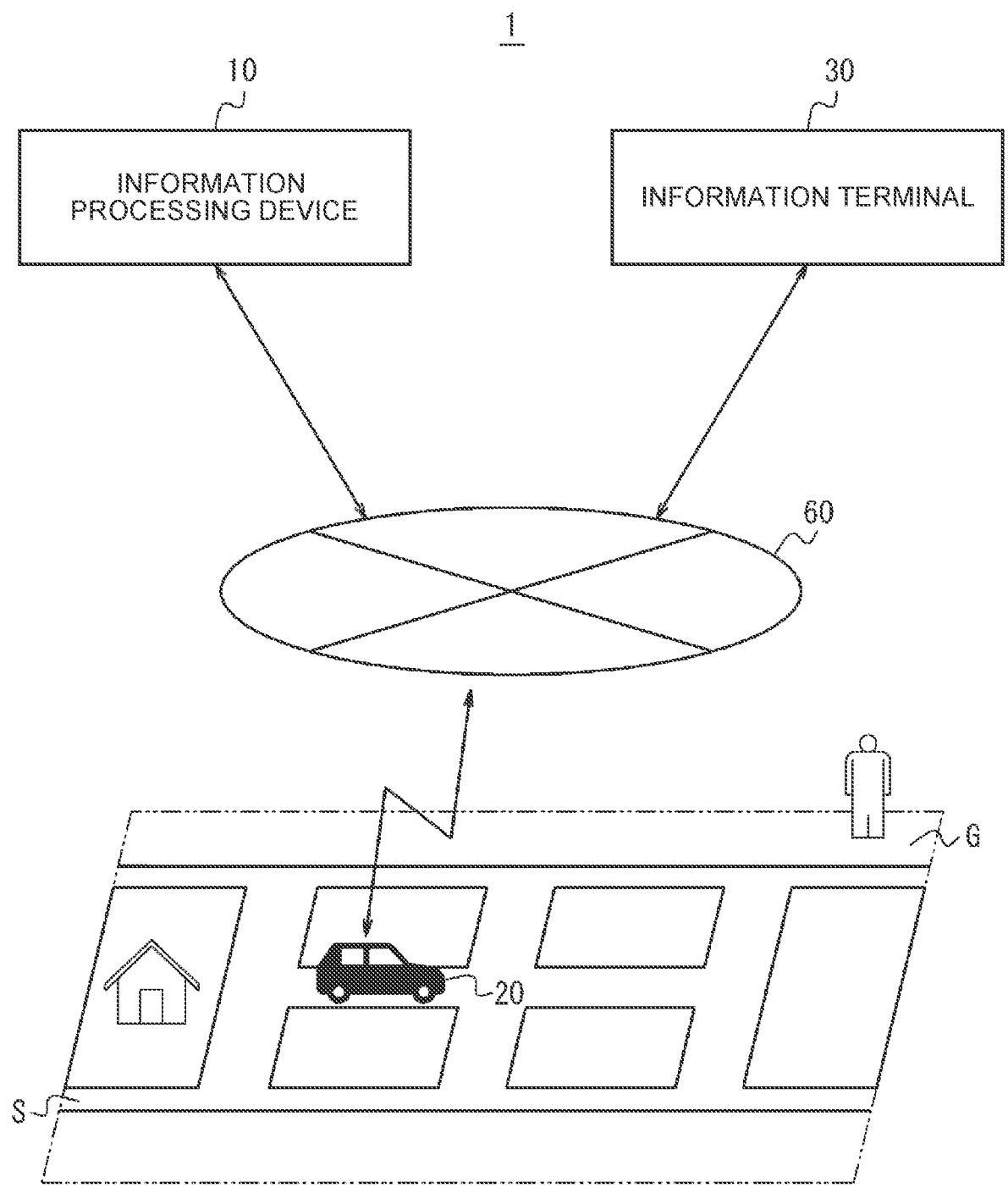
FIG. 9 is a diagram illustrating another application example of the route information providing system.

The route information providing system 1 is not limited to the one that presents, to the user, the movement route when the vehicle 20 is parked. For example, as illustrated in FIG. 9, the user may call the vehicle 20 having the autonomous driving function from a departing place S such as a home to a destination G that is a user's current position by using the information terminal 30. In such a case, movement of the vehicle 20 toward the destination is also included in the target of the route information providing system 1 of the present disclosure.

The vehicle 20 may transmit, to the information processing device 10, movement information including position information about passed positions on the way to the destination G. The positions on the way to the destination G may be rephrased as relay positions. In this case, the movement information may include position information about the relay positions. The position information about the relay positions may be latitude and longitude information, information for identifying branch points of roads, or the like. The movement information may further include information on times when the vehicle 20 has passed the relay positions. The first communicator 11 of the information processing device 10 sequentially acquires, from the vehicle 20, pieces of position information about the relay positions where the vehicle 20 has passed on the way to the destination Gas pieces of position information about the destination. For example, the relay position may be a branch point of a road where the vehicle 20 travels. The relay position may be set to a position where the vehicle 20 passes at every predetermined time interval.

The first controller 12 of the information processing device 10 sequentially stores pieces of movement information acquired from the vehicle 20 in the first storage 13. The information processing device 10 can receive the request for route information of the vehicle 20 from the user's information terminal 30. When the request for route information is received, the first controller 12 of the information processing device 10 may generate route information indicating the time-series positions of the vehicle 20 based on the movement information stored in the first storage 13, and transmit the route information to the user's information terminal 30.

The information terminal 30 that has received the route information from the information processing device 10 may display the route information on the display panel by using a map illustrated in FIG. 10. In the example of FIG. 10, the movement information includes pieces of information on branch positions B1 to B5 of roads. A route connecting the branch positions B1 to B5 where the vehicle 20 has passed is displayed on the display panel of the information terminal 30.

As described above, the user can set the destination of the vehicle 20, move the vehicle 20, and check the route traveled by the vehicle 20 on the information terminal 30 during or after the movement. The user can check whether the vehicle 20 is following the route expected by the user during the movement. The user may set not only the destination but also a route during the movement by using the information terminal 30. The user can check, on the information terminal 30, that the vehicle 20 is moving or has moved to the destination along the set route. When the vehicle 20 has received a detour instruction from the outside due to traffic regulations and changed the route, the user can recognize the route change on the display of the information terminal 30.

The present disclosure is not limited to the embodiment described above, and may be modified or revised variously. For example, the functions included in each means, each step, or the like may be rearranged so as not to cause logical inconsistency, and a plurality of means, steps, or the like may be combined into a unit or divided apart from each other.

In the embodiment described above, the information processing device 10 generates the route information in response to the route information request from the user's information terminal 30, but the present disclosure is not limited to this case. The information processing device 10 may generate or update the route information each time the information processing device 10 receives movement information from the vehicle 20 or the parking lot server 50. The information processing device 10 may voluntarily transmit the route information to the information terminal 30.

The route information providing system 1 of the present disclosure is also applicable to acquisition of route information of a vehicle 20 that is an autonomous driving vehicle parked in a parking lot other than that of the automatic valet parking. For example, in a parking lot of a large facility, the user may intend to move the vehicle 20 to a parking space close to his/her current position. In that case, the user instructs the vehicle 20 to move by using the information terminal 30. The vehicle 20 instructed to move searches for a parking space close to the position of the user, and moves to the parking space. Even in such a case, the user can check the movement route and the current position of the vehicle 20 by using the information terminal 30.

What is claimed is:

1. An information processing device comprising:
a processor; and
a memory storing,
movement information relating to movement of a vehicle that is not occupied by a user
the movement of the vehicle including movement to change a parking position of the vehicle, and
the movement information including
position information of a movement destination; and
information indicating whether the movement to change a parking position of the vehicle is started voluntarily by the vehicle or started in response to an instruction from an external device located outside of the vehicle, and
program instructions that cause the processor to:
acquire the movement information of the vehicle,
calculate an evaluation value indicating validity of the instruction from the external device regarding the movement of the vehicle started in response to receiving the instruction from the external device, in a case where the movement of the vehicle is started in response to receiving the instruction from the external device;
not calculate an evaluation value indicating validity of the movement of the vehicle started voluntarily by the vehicle, in a case where the movement of the vehicle is the voluntary movement;
search the pieces of the movement information stored in the memory when the user performs a predetermined operation on an information terminal of the user,
generate route information indicating time-series positions of the vehicle;
transmit the route information and the evaluation value to the information terminal of the user; and
display the route information on a display panel of the information terminal.

2. The information processing device according to claim 1, wherein the voluntary movement of the vehicle includes movement of the vehicle to a location to be supplied energy.

3. The information processing device according to claim 1, wherein the external device located outside of the vehicle includes a server configured to manage a facility where the vehicle is parked.

4. The information processing device according to claim 3, wherein the processor is configured to acquire the movement information from the server.

5. The information processing device according to claim 1, wherein:
the movement of the vehicle includes movement toward a destination set by the user; and
the processor is configured to sequentially acquire, as the position information of the movement destination, pieces of position information about positions where the vehicle has passed on a way to the destination.

6. A route information providing method to be executed by an information processing device, the route information providing method comprising:
acquiring movement information relating to movement of a vehicle that is not occupied by a user
the movement of the vehicle including movement to change a parking position of the vehicle, and
the movement information including
position information of a movement destination; and
information indicating whether the movement to change a parking position of the vehicle is started voluntarily by the vehicle or started in response to an instruction from an external device located outside of the vehicle;
calculating an evaluation value indicating validity of the instruction from the external device regarding the movement of the vehicle started in response to receiving the instruction from the external device, in a case where the movement of the vehicle is started in response to receiving the instruction from the external device;
not calculate an evaluation value indicating validity of the movement of the vehicle started voluntarily by the vehicle, in a case where the movement of the vehicle is the voluntary movement;
storing the movement information of the vehicle;
searching the pieces of the movement information stored in the storage when the user performs a predetermined operation on an information terminal of the user;
generating route information indicating time-series positions of the vehicle;
transmitting the route information and the evaluation value to the information terminal of the user; and
displaying the route information on a display panel of the information terminal.

7. The route information providing method according to claim 6, wherein the voluntary movement of the vehicle includes movement of the vehicle to a location to be supplied energy.

8. The route information providing method according to claim 6, wherein the external device located outside of the vehicle includes a server configured to manage a facility where the vehicle is parked.

9. The route information providing method according to claim 8, further comprising acquiring the movement information from the server.

10. The route information providing method according to claim 6, wherein:
the movement of the vehicle includes movement of the vehicle toward a destination set by the user; and
pieces of position information about positions where the vehicle has passed on a way to the destination are sequentially acquired as the position information of the movement destination.

11. A route information providing system comprising:
a vehicle; and
an information processing device, wherein:
the vehicle includes a vehicle control device;
the vehicle control device is configured to transmit, to the information processing device, movement information relating to movement of the vehicle that is not occupied by a user the movement of the vehicle including movement to change a parking position of the vehicle, and
the movement information including
position information of a movement destination, and
information indicating whether the movement to change a parking position of the vehicle is started voluntarily by the vehicle or started in response to an instruction from an external device located outside of the vehicle; and
the information processing device includes
a storage configured to store the movement information of the vehicle, and
a processor configured to
acquire the movement information from the vehicle,
calculate an evaluation value indicating validity of the instruction from the external device regarding the movement of the vehicle started in response to receiving the instruction from the external device, in a case where the movement of the vehicle is started in response to receiving the instruction from the external device,
not calculate an evaluation value indicating validity of the movement of the vehicle started voluntarily by the vehicle, in a case where the movement of the vehicle is the voluntary movement,
search the pieces of the movement information stored in the storage when the user performs a predetermined operation on an information terminal of the user,
generate route information indicating time-series positions of the vehicle based on the movement information stored in the storage,
transmit the route information and the evaluation value to the information terminal of the user, and
display the route information on a display panel of the information terminal.

12. The route information providing system according to claim 11, wherein the voluntary movement of the vehicle includes movement of the vehicle to a location to be supplied energy.

13. The route information providing system according to claim 11, wherein the external device located outside of the vehicle includes a server configured to manage a facility where the vehicle is parked.

* * * * *